United States Patent

Stelts et al.

[15] 3,672,222
[45] June 27, 1972

[54] INSTRUMENT LANCE FOR BASIC OXYGEN STEELMAKING FURNACE

[72] Inventors: Philip D. Stelts, Center Valley; David W. Kern, Slatedale, both of Pa.

[73] Assignee: Bethlehem Steel Corporation

[22] Filed: Dec. 16, 1970

[21] Appl. No.: 98,490

[52] U.S. Cl. ............................. 73/343 R, 73/359, 136/234, 169/2 R
[51] Int. Cl. ......................................................... G01k 1/10
[58] Field of Search ..................... 73/343 R, 359, DIG. 9; 136/234; 169/2 R; 73/DIG. 9

[56] References Cited

UNITED STATES PATENTS

| | | |
|---|---|---|
| 2,024,316 | 12/1935 | Theissing ............................ 169/2 R |
| 2,833,844 | 5/1958 | Burton ................................... 73/359 |
| 3,327,531 | 6/1967 | Fradeneck ............................. 73/359 |
| 3,530,716 | 9/1970 | Truppe ................................ 73/343 R |

Primary Examiner—Louis R. Prince
Assistant Examiner—Denis E. Corr
Attorney—John I. Iverson

[57] ABSTRACT

An instrument lance for introducing expendable immersion thermocouple devices into a molten steel bath contained in a basic oxygen steelmaking furnace. The instrument lance has means to introduce an inert gas and a fire retardant liquid against the outer surface of the thermocouple devices in order to prevent premature failure of the thermocouple elements as a result of the high temperature present in the heated interior of the basic oxygen steelmaking furnace.

4 Claims, 2 Drawing Figures

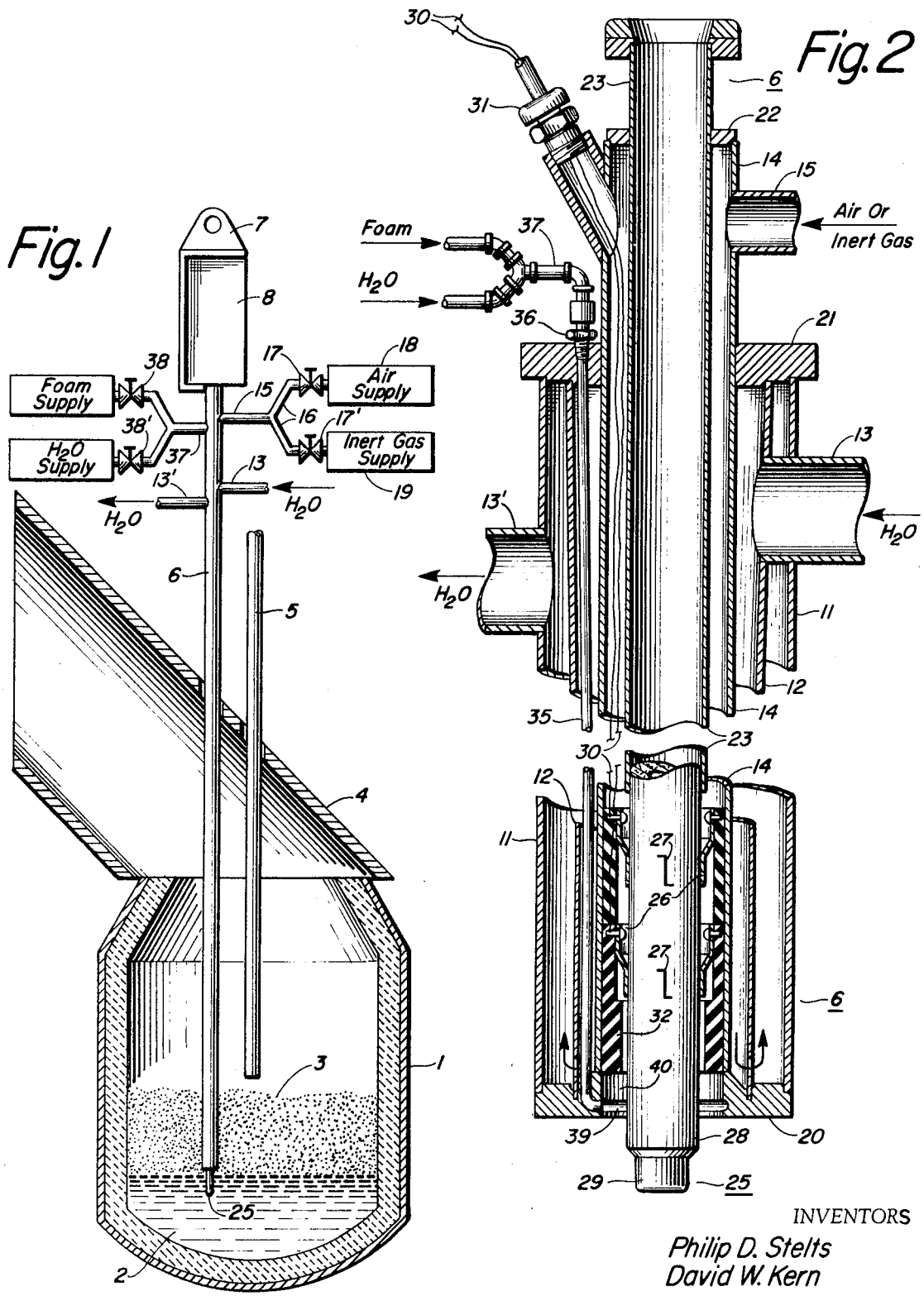

3,672,222

INSTRUMENT LANCE FOR BASIC OXYGEN STEELMAKING FURNACE

BACKGROUND OF THE INVENTION

This invention relates to an auxiliary instrument lance that is used on a basic oxygen steelmaking furnace. One such lance is disclosed in U.S. Pat. No. 3,327,531 issued June 27, 1967 to R. J. Fradeneck. The instrument lance is used to introduce expendable immersion thermocouple devices into a molten steel bath contained in the basic oxygen furnace in order to obtain the temperature of the bath of molten steel while the furnace is still in an upright position.

As further described in the aforementioned U.S. Pat. No. 3,327,531 to Fradeneck, the cylindrical thermocouple devices are stored in a magazine at the rear of the lance and are fed one at a time to the forward face of the lance through a conduit extending through the center of the lance. Other lances are designed so that the thermocouple device is merely attached to the end of the lance.

The thermocouple devices frequently used with such lances are usually encased in a tubular cardboard sleeve. It has been observed that the cardboard sleeve ignites when the thermocouple is immersed in the molten metal bath and often the combustion progresses so rapidly that the delicate wiring inside the devices is destroyed before a reading of the bath temperature can be obtained. Since in many basic oxygen furnace shops, the bath temperature measurement is essential for the successful operation of the furnace, much valuable production time can be lost due to a missed bath temperature measurement.

SUMMARY OF THE INVENTION

It is therefore an object of this invention to provide an instrument lance which will protect the thermocouple device from the high temperatures present in a basic oxygen furnace until an accurate temperature measurement can be obtained.

Other and further objects of this invention will become apparent from the following description and the accompanying drawings and claims.

It has been discovered that the foregoing objects can be obtained by an instrument lance having means to introduce an inert gas and one or more fire retardant liquids against the outer surface of the thermocouple device while the device is being retained at the end of the lance in the furnace.

BRIEF DESCRIPTION OF THE DRAWINGS

FIG. 1 is a cross-sectional view of a basic oxygen furnace with the auxiliary instrument lance of this invention in position adjacent the oxygen lance.

FIG. 2 is a broken sectional view of the instrument lance of this invention.

DESCRIPTION OF PREFERRED EMBODIMENTS

Referring to the drawings, FIG. 1 shows a basic oxygen furnace 1 which contains a bath of molten steel 2 and a layer of molten slag 3. A hood 4 to collect the fumes encloses the mouth of the basic oxygen furnace 1 when it is in the upright operation position. A water-cooled oxygen lance 5 passes through the hood 4 and introduces the gaseous oxygen used in referring the molten iron and scrap into steel.

An auxiliary instrument lance 6 also passes through the hood 4 adjacent to the oxygen lance 5. The auxiliary instrument lance 6 has support means 7 at its upper end which permits the lance to be raised or lowered relative to the level of the bath of molten steel 2 in the furnace 1. A magazine 8, as described in U.S. Pat. No. 3,327,531 to R. J. Fradeneck is also attached to the upper end of the instrument 6 and contains the expendable immersion thermocouple elements used with the instrument lance 6. The thermocouple devices 25 may take the form of the devices described in the above-mentioned U.S. Pat. No. 3,327,531 to R. J. Fradeneck or the devices described in our copending U.S. Pat. application, Ser. No. 661,616 filed Aug. 18, 1967 now U.S. Pat. No. 3,574,598, or any other well-known form of expendable thermocouples.

Referring to FIGS. 1 and 2, the instrument lance 6 comprises a plurality of concentric pipes. The outermost pipe 11 and an intermediate pipe 12 form a pair of cooling water passages in which cooling water enters the upper ends of these pipes through a cooling water inlet 13 and is then circulated within the body of the lance 6 before it is discharged through the cooling water outlet 13'. Spaced inside this water jacket formed by pipes 11 and 12 is another pipe 14 of smaller diameter. Pipe 14 has an inlet 15 at its rearward end which connects through conduits 16 and valve 17 and 17' to a source of high pressure air 18 and a source of high pressure inert gas 19 (argon, nitrogen, etc.) located remote from the lance 6 but connected in parallel thereto by the conduits 16 to the gas inlet 15. A metal front cover plate 20 and rear cover plates 21 and 22 seal the ends of pipes 11, 12 and 14.

Spaced concentrically within pipe 14 is another pipe 23 of still smaller diameter. As shown in FIG. 2, pipe 23 extends only part way along the length of lance 6. Pipe 23 serves as a conduit for the passage of the expendable thermocouple devices 25 from the magazine 8 to the forward end of the lance 6. The thermocouple device 25 is retained in the forward end of the lance 6 by a pair of spring slip rings 26 which also provide the electrical contact to wires 27 embedded in the cardboard sleeve 28 which encases the thermocouple device 25 which wires lead to the platinum-platinum-rhodium thermocouple element (not shown) enclosed in a protective sheet metal cap 29 at the forward end of the thermocouple device 25. A pair of wires 30 lead from the slip ring contacts 26 up the lance between pipes 14 and 23 and out through the wall of pipe 14 at its rearward and through a suitable gas tight connector 31 to a temperature recording device (not shown). A short length of tubular insulating material 32 electrically insulates the slip rings 26 from pipe 14.

A small diameter tube 35 extends down the cooling water passageway formed between pipes 12 and 14. One end of tube 35 is connected by a suitable connector 36 to a conduit 37 that leads to a source of water under pressure and a source of fire extinguisher foam under pressure connected in parallel to the conduit 37 by valves 38 and 38'. The fire extinguisher foam is that commonly used for fighting flammable liquid fires and is made by mixing an alkaline salt solution (usually bicarbonate of soda) with an acid salt solution (usually aluminum sulphate). The other end of tube 35 terminates in a groove 39 formed in the annulus 40 of the front cover plate 20.

In operation, valve 17 or 17' is opened to permit a flow of high pressure air or inert gas to enter pipe 14. Lance 6 is then lowered toward the molten metal bath 2. As the lance 6 is lowered, an expendable immersion thermocouple device 25 is ejected from the magazine 8 into pipe 23 and forced downwardly until it is locked into place at the forward end of the lance 6 by the slip rings 26 with the thermocouple element protected by the cap 29 projecting from the end of lance 6. As the thermocouple device 25 enters the bath 2, valves 38 and 38' are opened to permit fire extinguishing foam or water or both to flow into tube 35 where it passes down the length of lance 6 to the groove 39 in the annular opening 40 of the front cover plate 20 where it is then sprayed on the outer surface of the cardboard sleeve 28 of the thermocouple device 25.

The flow of inert gas, water and foam is continued until the desired temperature measurement has been obtained. When using thermocouple devices such as described in our copending U.S. Pat. application, Ser. No. 661,616 which take a sample of the molten metal bath 2, and then measures the liquidus-arrest temperature of the sample, the spraying with foam or water or both is continued while the lance is retracted since the desired temperature measurement is usually not obtained until several seconds after the sample is taken from the bath. When the lance is completely retracted in a safe position in hood 4, the used thermocouple device is ejected and valves 17', 38 and 38' are closed and valve 17 opened to provide a continuous flow of air in the lance which prevents any foreign material from entering the annular opening 40 between measurements.

It is clear that the invention may be adapted for use with instrument lances of designs other than that described, as well as with various types of expendable measuring instruments.

We claim:

1. Apparatus for introducing an elongated cylindrical measuring instrument into the heated interior of a furnace comprising:
   a. an elongated lance assembly,
   b. means to retain said measuring instrument at one end of said lance assembly,
   c. means for introducing an inert gas through said lance assembly and around the outer surface of said measuring instrument,
   d. means for introducing one or more fire retarding liquids through said lance assembly and onto the outer surface of said measuring instrument.

2. The apparatus of claim 1 in which the measuring instrument is a thermocouple device.

3. The apparatus of claim 1 in which the fire retarding liquid is a foam.

4. Apparatus for introducing an elongated cylindrical thermocouple device into the heated interior of a furnace comprising:
   a. an elongated lance assembly having a central conduit running therethrough and open at one end,
   b. means to retain said thermocouple device in the open end of said conduit,
   c. means for introducing an inert gas into said conduit around the outer surface of said thermocouple device,
   d. means surrounding the open end of said conduit for introducing one or more fire retardant liquids against the outer surface of said thermocouple device.

* * * * *